(12) United States Patent
Pontiller-Schymura

(10) Patent No.: US 11,169,339 B2
(45) Date of Patent: Nov. 9, 2021

(54) EXPOSURE DEVICE FOR AN APPARATUS FOR THE ADDITIVE PRODUCTION OF THREE-DIMENSIONAL OBJECTS

(71) Applicant: CL SCHUTZRECHTSVERWALTUNGS GMBH, Lichtenfels (DE)

(72) Inventor: Peter Pontiller-Schymura, Neudrossenfeld (DE)

(73) Assignee: CONCEPT LASER GMBH, Lichtenfels (DE)

( * ) Notice: Subject to any disclaimer, the term of this patent is extended or adjusted under 35 U.S.C. 154(b) by 0 days.

(21) Appl. No.: 15/917,312

(22) Filed: Mar. 9, 2018

(65) Prior Publication Data
US 2018/0259732 A1    Sep. 13, 2018

(30) Foreign Application Priority Data

Mar. 9, 2017    (DE) .......................... 102017105057.4

(51) Int. Cl.
*G02B 6/42* (2006.01)
*B29C 64/268* (2017.01)
(Continued)

(52) U.S. Cl.
CPC ............ *G02B 6/4296* (2013.01); *B22F 10/20* (2021.01); *B23K 26/0626* (2013.01);
(Continued)

(58) Field of Classification Search
None
See application file for complete search history.

(56) References Cited

U.S. PATENT DOCUMENTS 6,818,854 B2 * 11/2004 Friedman ........... B23K 26/0604
                                                  219/121.6
7,760,976 B1 * 7/2010 Tidwell .................. G02B 27/20
                                                  385/116
(Continued)

FOREIGN PATENT DOCUMENTS

DE     102015010892 A1    3/2016
EP         2281677 A1    2/2011
(Continued)

OTHER PUBLICATIONS

Japanese Office Action Corresponding with JP Application 2017-251536.
(Continued)

*Primary Examiner* — Chris H Chu
(74) *Attorney, Agent, or Firm* — Dority & Manning, P.A.

(57) ABSTRACT

Exposure device (6) for an apparatus (1) for the additive production of three-dimensional objects (2), comprising: —at least one energy beam generating device (7), which is configured in order to generate an energy beam (4), —at least one light-guide fibre (8), which is optically couplable or coupled to the energy beam generating device (7) and is configured in order to guide at least one energy beam (4), introduced into it, between an input region (8a) of the light-guide fibre (8) and an output region (8b) of the light-guide fibre (8), the light-guide fibre (8) comprising a plurality of fibre cores (15), at least one energy beam (4) being introducible or introduced into each fibre core (15).

19 Claims, 3 Drawing Sheets

Figure 1:
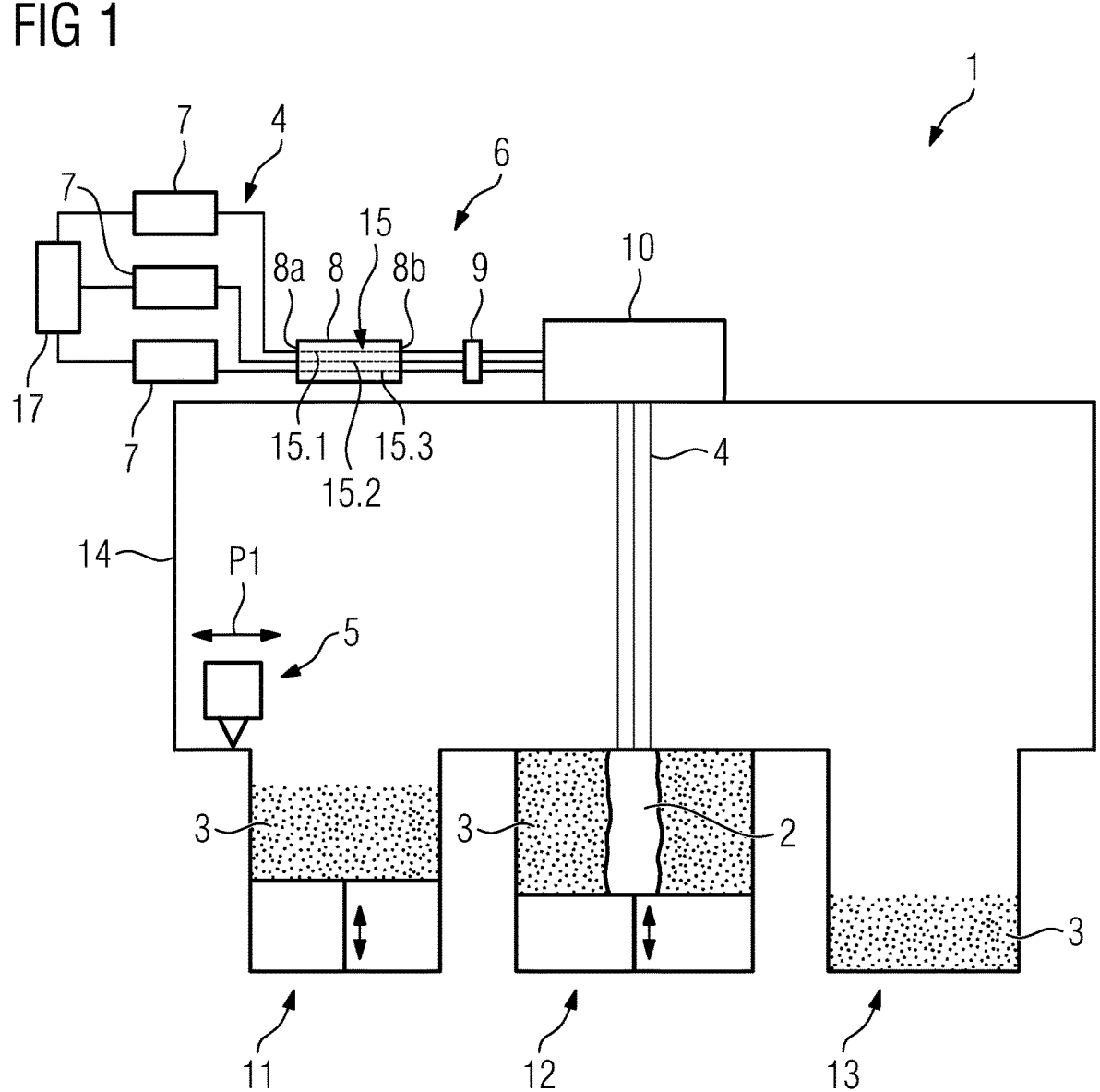

(51) Int. Cl.
  B33Y 30/00 (2015.01)
  B23K 26/082 (2014.01)
  G02B 6/02 (2006.01)
  B22F 10/20 (2021.01)
  B23K 26/06 (2014.01)
  B22F 10/30 (2021.01)
  B33Y 10/00 (2015.01)
  B33Y 50/02 (2015.01)
  B29C 64/153 (2017.01)
  B29C 64/393 (2017.01)

(52) U.S. Cl.
  CPC .......... B23K 26/082 (2015.10); B29C 64/268 (2017.08); B33Y 30/00 (2014.12); G02B 6/02042 (2013.01); B22F 10/30 (2021.01); B29C 64/153 (2017.08); B29C 64/393 (2017.08); B33Y 10/00 (2014.12); B33Y 50/02 (2014.12)

(56) References Cited

U.S. PATENT DOCUMENTS

| | | | |
|---|---|---|---|
| 2002/0045811 A1* | 4/2002 | Kittrell | A61B 1/00096 600/407 |
| 2014/0263209 A1 | 9/2014 | Burris et al. | |
| 2015/0165556 A1 | 6/2015 | Jones et al. | |
| 2016/0062036 A1 | 3/2016 | Mori | |
| 2017/0021455 A1* | 1/2017 | Dallarosa | B33Y 10/00 |
| 2018/0185960 A1* | 7/2018 | Coskun | B23K 26/0608 |

FOREIGN PATENT DOCUMENTS

| | | |
|---|---|---|
| EP | 3017895 A1 | 5/2016 |
| JP | 2016043405 A | 4/2016 |
| JP | 2018/149596 A | 9/2018 |

OTHER PUBLICATIONS

European Search Report Corresponding to Application No. 17180184 dated Feb. 6, 2018.
German Search Report Corresponding to Application No. 102017105057 dated Apr. 3, 2019.
Chinese Search Report Corresponding to Application No. 201710789708 dated Nov. 14, 2019.
Machine Translated Japanese Office Action Corresponding to Application No. 2019228176 dated Oct. 26, 2020.

* cited by examiner

EXPOSURE DEVICE FOR AN APPARATUS FOR THE ADDITIVE PRODUCTION OF THREE-DIMENSIONAL OBJECTS

CROSS-REFERENCE TO RELATED APPLICATIONS

This application claims priority to German Patent Application serial no. 10 2017 105 057.4 filed Mar. 9, 2017, the contents of which are incorporated herein by reference in their entirety as if set forth verbatim.

DESCRIPTION

The invention relates to an exposure device for an apparatus for the additive production of three-dimensional objects, comprising at least one energy beam generating device, which is configured in order to generate an energy beam, and at least one light-guide fibre, which is optically couplable or coupled to the energy beam generating device and is configured in order to guide at least one energy beam, introduced into it, between an input region of the light-guide fibre and an output region of the light-guide fibre.

As is known, apparatuses for the additive production of three-dimensional objects comprise an exposure device, which comprises an energy beam generating device and a light-guide fibre optically coupled thereto. The energy beam generating device is configured in order to generate an energy beam, and the light-guide fibre is configured in order to guide at least one energy beam, introduced into it, between an input region of the light-guide fibre and an output region of the light-guide fibre.

It is likewise known that corresponding apparatuses are being constantly refined and improved, particularly with a view to aspects such as component and process quality, efficiency, productivity, etc. In this case, the configuration of the respective exposure devices of corresponding apparatuses, i.e. in particular the configuration of corresponding light-guide fibres, is also becoming increasingly important.

The object of the invention is to provide an exposure device for an apparatus for the additive production of three-dimensional objects, which device is improved particularly with a view to improvement of the component and process quality, efficiency and productivity of an apparatus for the additive production of three-dimensional objects.

The object is achieved by an exposure device according to the claims for an apparatus for the additive production of three-dimensional objects. The claims dependent thereon relate to possible embodiments of the exposure device. The object is furthermore achieved by an apparatus according to the claims for the additive production of three-dimensional objects which comprises at least one corresponding exposure device.

The exposure device described here is typically a constituent part of an apparatus ("apparatus") for the additive production of three-dimensional objects. By means of a corresponding apparatus, three-dimensional objects to be produced can be constructed additively by successive layerwise selective exposure and consequent successive layerwise selective solidification of construction material layers in the regions corresponding to the layer-related cross section of the three-dimensional object to be produced, from a construction material that can be solidified by means of an energy beam. A corresponding apparatus may for example be configured as an SLM apparatus, i.e. as an apparatus for carrying out selective laser melting methods (SLM methods), or as an SLS apparatus, i.e. as an apparatus for carrying out selective laser sintering methods (SLS methods). It is also conceivable for a corresponding apparatus to be configured as an SEBS apparatus, i.e. as an apparatus for carrying out selective electron beam melting methods (SEBS methods).

A corresponding apparatus comprises the functional component parts typically required in order to carry out additive construction processes. Besides a layering device, which is configured in order to form construction material layers to be selectively exposed, or to be selectively solidified, in a construction plane of the apparatus, in which the successive layerwise selective exposure and the consequent successive layerwise selective solidification of construction material layers of the construction material that can be solidified by means of an energy beam, i.e. for example a ceramic powder, plastic powder or metal powder, take place, these also include a corresponding exposure device which is generally configured for the selective exposure of construction material layers to be selectively solidified in the construction plane of the device.

The exposure device comprises as essential constituent parts at least one energy beam generating device and at least one light-guide fibre optically couplable or coupled to the energy beam generating device. The energy beam generating device is configured in order to generate an energy beam—which is typically a laser beam. The light-guide fibre is configured in order to guide at least one energy beam, introduced into it, between an input region of the light-guide fibre and an output region of the light-guide fibre. Optical coupling of the energy beam generating device to the light-guide fibre makes it possible to introduce the energy radiation generated by the energy beam generating device, i.e. in particular an energy beam generated by the energy beam generating device, into the light-guide fibre. The light-guide fibre may furthermore be coupled to a beam steering device (scanner device). Optical coupling of the exposure device to the beam steering device makes it possible to introduce energy radiation, i.e. in particular at least one energy beam guided by the light-guide fibre, from the light-guide fibre into the beam steering device. The light-guide fibre may therefore be arranged connected or be formed between the energy beam generating device and a beam steering device, which is optionally likewise a constituent part of the exposure device.

The light-guide fibre comprises a plurality of fibre cores, at least one energy beam being introducible or introduced into each fibre core. The light-guide fibre can to this extent be referred to or considered as a multicore fibre. Each fibre core is formed from a light-guiding material, i.e. for example a glass fibre material, and therefore has light-guiding properties; each fibre core is therefore to be referred to or considered as a separate light-guide element (inside) of the light-guide fibre. Each fibre core comprises a fibre core input region, via which an energy beam is introducible or introduced into the respective fibre core, and a fibre core output region, via which an energy beam introduced into the respective fibre core can be or is output from the respective fibre core. A respective fibre core input region typically forms a part of the input region of the light-guide fibre, and a respective fibre core output region typically forms a part of the output region of the light-guide fibre.

The light-guide fibre typically has a cable-like or cable-shaped, i.e. generally an elongate, geometrical configuration. A respective fibre core typically has a fibre-like or fibre-shaped, i.e. generally an elongate, geometrical configuration. The respective cross-sectional geometry of the fibre cores is typically much smaller than the cross-sectional geometry of the light-guide fibre, so that the fibre cores may readily be arranged or formed inside the light-guide fibre. (Positionally stable) arrangement of the fibre cores inside the light-guide fibre may, for example, be carried out by embedding the fibre cores in a light-guide fibre material forming the light-guide fibre, i.e. for example a plastic material.

By formation of the light-guide fibre with a plurality of separate fibre cores, it is possible to introduce a plurality, as will be seen below, of energy beams optionally differing in relation to at least one energy beam parameter, i.e. for example intensity, into the light-guide fibre, or to output a plurality of energy beams optionally differing in relation to at least one energy beam parameter from the light-guide fibre or the exposure device. In this way, a variatable or variable profile of the energy radiation which can be or is output overall from the exposure device can be produced with one and the same light-guide fibre. This generally allows controlled and effective use of the energy radiation introduced into the light-guide fibre by means of the energy beam generating device; in particular, as will be seen below, for example, controlled thermal pretreatment and/or aftertreatment of a construction material layer which is to be selectively solidified or has been selectively solidified, as well as controlled generation of particular radiation profiles are made possible. The exposure device is therefore improved, which in particular has the effect that it allows improved component and process quality, efficiency and productivity of an apparatus equipped with the exposure device. By the possibility of the output of a plurality of energy beams from the light-guide fibre, which is offered by the multiplicity of fibre cores—the maximum number of energy beams which can be output from the light-guide fibre in this case corresponds to the number of fibre cores—the exposure device furthermore allows faster construction rates.

In relation to the coupling of the at least one light-guide fibre to the at least one energy beam generating device, there are in principle two possible variants: the at least one light-guide fibre may be couplable or coupled directly or indirectly, i.e. with the interposition of at least one component or at least one component group, to the at least one energy beam generating device.

The variant according to which a light-guide fibre is optically couplable or coupled directly to the energy beam generating device also includes, in particular, the possibility that the light-guide fibre is optically couplable or coupled to a plurality of energy beam generating devices, each fibre core of the light-guide fibre being optically couplable or coupled to at least one particular energy beam generating device of the plurality of energy beam generating devices. An energy beam emerging from the energy beam generating device optically couplable or coupled to each fibre core may therefore be introducible or introduced into this fibre core.

Respective energy beams generated by respective energy beam generating devices may differ in terms of at least one energy beam parameter, i.e. for example intensity. In this way, it is possible to introduce a plurality of energy beams optionally differing in relation to at least one energy beam parameter into the light-guide fibre, or to output a plurality of energy beams optionally differing in relation to at least one energy beam parameter from the light-guide fibre or the exposure device. Respective energy beam generating devices optically couplable or coupled to the light-guide fibre may be configured distinctly or individually, particularly in relation to the beam properties of the respective energy beams generated by them, in such a way that an energy beam having particular energy beam properties can be introduced into the light-guide fibre by means of each energy beam generating device.

The variant according to which a light-guide fibre is optically couplable or coupled indirectly to the energy beam generating device includes the possibility that the light-guide fibre is optically couplable or coupled to the at least one energy beam generating device with the interposition of at least one energy beam splitting device, which is configured in order to split an energy beam introduced into it into a plurality of energy beams. The energy beam splitting device typically comprises at least one, in particular optical, energy beam splitting element. A corresponding energy beam splitting element may, for example, be an optical beam splitter (cube). Each fibre core of the light-guide fibre may in this case be optically couplable or coupled to at least one output region of the energy beam splitting device, from which an energy beam can be or is output, an energy beam output from the output region, couplable or coupled to each fibre core, of the energy beam splitting device being introducible or introduced into this fibre core.

The energy beam splitting device may be configured in order to split an energy beam into a plurality of energy beams optionally differing in relation to at least one energy beam parameter, as mentioned, for example intensity. In this way, even with a single energy beam generating device, it is possible to introduce a plurality of energy beams optionally differing in relation to at least one energy beam parameter into the light-guide fibre, or to output a plurality of energy beams optionally differing in relation to at least one energy beam parameter from the light-guide fibre or the exposure device. The energy beam splitting device may, for example by suitable coating of an energy beam splitting surface, be configured in such a way that in principle different energy beams can be introduced into the light-guide fibre by means of the energy beam splitting device.

The comments above show that different energy beams, i.e. energy beams with different energy beam properties, may be introducible or introduced into at least two fibre cores of the light-guide fibre. For example, an energy beam or energy beams with first energy beam properties, in particular a first intensity, may be introduced into a first fibre core, or a group of first fibre cores, and an energy beam or energy beams with energy beam properties different from the first energy beam properties, in particular an intensity different from the first intensity, may be introduced into at least one further fibre core, or into a group of further fibre cores.

Regardless of the direct or indirect introduction of respective energy beams into respective fibre cores of the light-guide fibre, the fibre cores may have the same or different fibre core geometries, in particular cross-sectional fibre core geometries. The energy beams which can be or are output via the respective fibre cores may therefore have the same or different energy beam geometries, in particular energy beam diameters (spots) or energy beam cross sections. The properties of the energy radiation which can be or is output (overall) from the light-guide fibre may also be influenced in a controlled way by the provision of fibre cores having different fibre core geometries.

The fibre cores may be arranged distributed symmetrically or asymmetrically over the in particular round or roundish, i.e. for example ellipsoid, cross-sectional area of the light-guide fibre. In particular, for an embodiment of a light-guide fibre with a round or roundish cross-sectional area, arrangement of at least one first fibre core at the centre (with respect to a symmetry axis or central axis) of the light-guide fibre and arrangement of further fibre cores outside the centre of the light-guide fibre may be envisaged. Starting with a light-guide fibre having a round or roundish cross-sectional area, fibre cores may therefore be arranged at different radial positions with respect to the symmetry axis or central axis of the light-guide fibre. For example, a first number of fibre cores, i.e. at least one fibre core, may be arranged centrally, i.e. at or in the region of the symmetry axis or central axis of the light-guide fibre, and a second number, i.e. in particular a multiplicity, of fibre cores may be arranged, in particular distributed symmetrically, around the first number of fibre cores. The properties of the energy radiation which can be or is output (overall) from the light-guide fibre may also be influenced in a controlled way by such an arrangement of fibre cores, optionally having different fibre core geometries.

Regardless of their respective arrangement relative to a symmetry axis or central axis of the light-guide fibre, the fibre cores may be arranged distributed equidistantly relative to one another. The distance from each fibre core to each fibre core arranged immediately next to it may therefore be the same. Correspondingly, the spacing of the energy beams, or spots, which can be or are output from the respective fibre cores is also the same, which leads to more homogeneous properties of the energy radiation which can be or is output overall from the exposure device, and therefore to a more homogeneous emission behaviour of the exposure device. Equally, output of energy radiation from the exposure device over the surface of the cross section is made possible.

As mentioned, energy beams may be introduced individually, or energy beams with different energy beam properties, in particular different intensity, may be introduced individually into the fibre cores of the light-guide fibre. To this end, the exposure device may comprise a control device, which is implemented as hardware and/or software and is configured in order to control the energy beams, or the energy beam properties of the energy beams introducible or introduced into the fibre cores of the light-guide fibre, or a corresponding control device may be assigned to the exposure device. The control device interacts in terms of control technology in particular with corresponding energy beam generating devices of the exposure device, in order to control the energy beams or the energy beam properties of the energy beams which can be or are output therefrom.

The control device may, for example, be configured in order to form a defined profile, in particular intensity profile, of the energy radiation which can be or is output overall from the exposure device, by defined control, in particular as a function of position and/or time, of the energy beams or the energy beam properties, in particular the intensity, of the energy beams introducible or introduced into the fibre cores. In this way, i.e. in particular by individual control of the intensities of the energy beams introducible or introduced into the fibre cores, in principle (almost) any desired profile may be generated (beam shaping) and output from the light-guide fibre, so that merely by way of example reference is made to Gaussian, inverse Gaussian and top-hat profiles.

The control device may furthermore be configured in order to form a particular exposure pattern of the energy radiation which can be or is output overall from the exposure device, by defined control, in particular as a function of position and/or time, of the energy beams or the energy beam properties of the energy beams introducible or introduced into the fibre cores of the light-guide fibre. In this way, in principle (almost) any desired exposure pattern may be generated. Corresponding exposure patterns may be based on the implementation of particular exposure strategies, i.e. for example the so-called chase strategy, according to which a second energy beam is tracked after a first energy beam and by means of which thermal after-treatment of a selectively solidified construction material layer can be carried out, or the wobble strategy, according to which energy beams are moved around a particular region to be exposed of a construction material layer. By means of corresponding exposure patterns or exposure strategies, it is in general also possible to carry out single or multiple exposures of particular regions of a construction material layer which are to be exposed.

It has already been mentioned that thermal pretreatment and/or after-treatment of a construction material layer which is to be selectively solidified or has been selectively solidified can be carried out with the light-guide fibre. To this end, the control device may be configured, by defined control of the energy beams or the energy beam properties of the energy beams introducible or introduced into the fibre cores of the light-guide fibre, in order to carry out selective exposure and consequent selective solidification of a construction material layer by means of at least one first energy beam which can be or is output from at least one first fibre core, and in order to carry out thermal pretreatment, at least in sections, of a construction material layer to be selectively solidified and/or thermal after-treatment, at least in sections, of a selectively solidified construction material layer by means of a further energy beam which can be or is output from at least one further fibre core. The energy beam for selective exposure and consequent selective solidification of a construction material layer may, for example, be output from at least one fibre core arranged in the middle or centrally with respect to the cross-sectional geometry of the light-guide fibre, and the or an energy beam for thermal pretreatment of a construction material layer to be selectively solidified or for thermal after-treatment of a selectively solidified construction material layer may be output from at least one fibre core arranged away from the middle or off-centre with respect to the cross-sectional geometry of the light-guide fibre.

Besides the exposure device, the invention also relates to an apparatus for the additive production of three-dimensional objects by successive layerwise selective exposure and consequent successive layerwise selective solidification of construction material layers of a construction material that can be solidified by means of an energy beam. The apparatus comprises at least one exposure device as described, so that all comments in connection with the exposure device apply similarly for the apparatus. The apparatus may in particular be an SLM apparatus, i.e. an apparatus for carrying out selective laser melting methods (SLM methods), or an SLS apparatus, i.e. an apparatus for carrying out selective laser sintering methods (SLS methods). In principle, it is also conceivable for the apparatus to be an SEBS apparatus, i.e. an apparatus for carrying out selective electron beam melting methods (SEBS methods).

Figure 2:
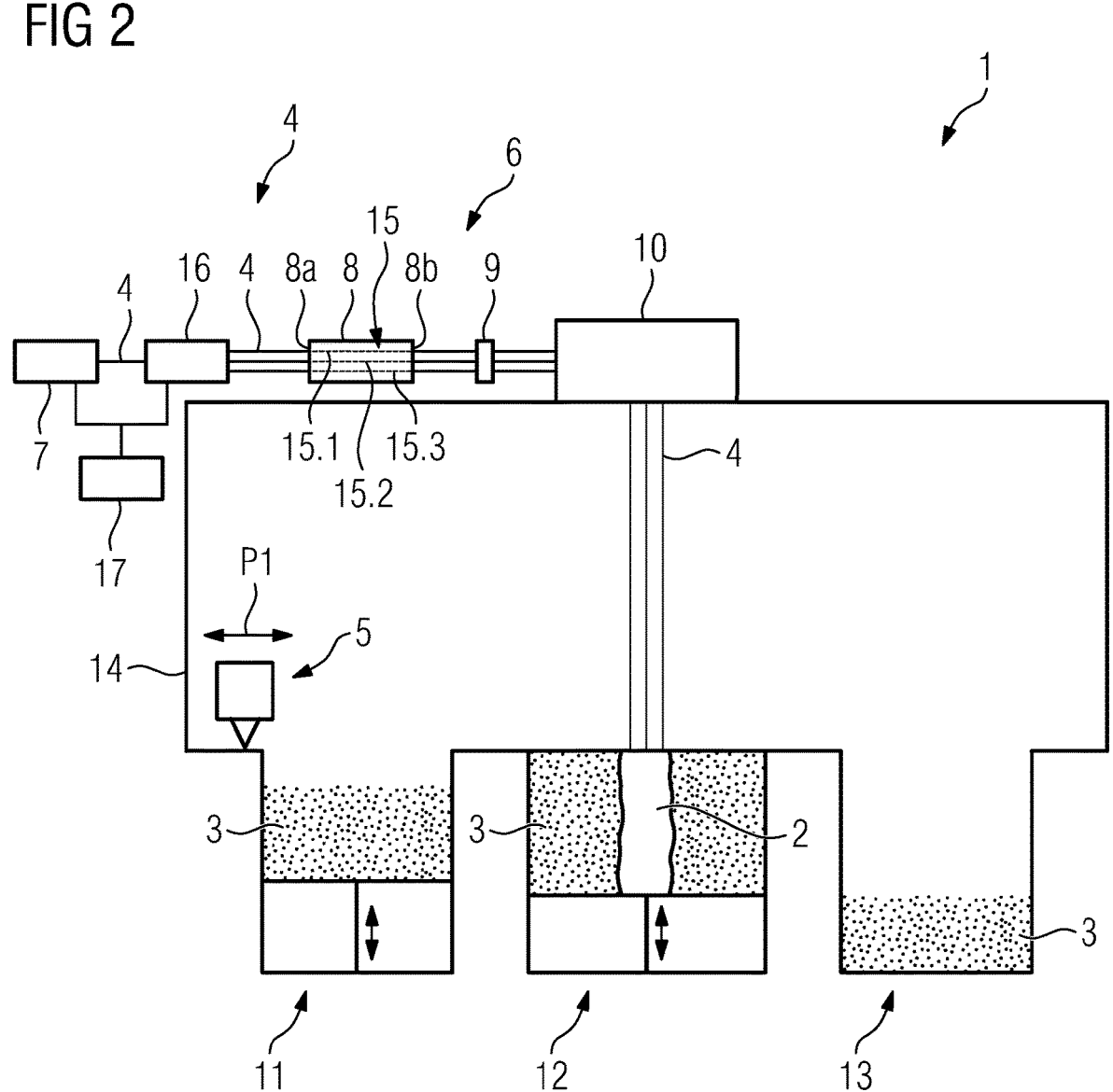
Figure 3:
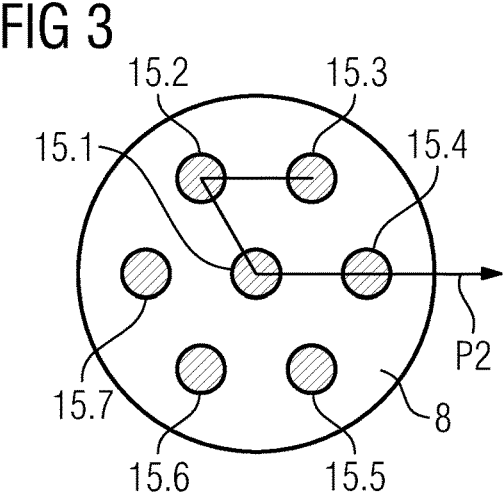

The invention is explained in more detail with the aid of exemplary embodiments in the figures of the drawing, in which:

FIGS. 1, 2 each show a diagrammatic representation of an apparatus according to one exemplary embodiment in a schematic view;

FIGS. 3-8 each show a diagrammatic representation of a light-guide fibre according to one exemplary embodiment in a cross-sectional view.

FIGS. 1, 2 each show a diagrammatic representation of an apparatus 1 according to one exemplary embodiment in a schematic view.

The apparatuses shown in FIGS. 1, 2 are used for the additive production of three-dimensional objects 2, i.e. in particular technical components or technical component groups, by successive layerwise selective exposure and consequent successive layerwise selective solidification of construction material layers of a solidifiable construction material 3, i.e. for example a metal powder, by means of at least one energy beam 4, i.e. in particular a laser beam. The selective solidification of respective construction material layers to be solidified is carried out on the basis of object-related construction data. Corresponding construction data describe the geometrical or geometry-design configuration of the object 2 respectively to be produced additively, and may for example contain "sliced" CAD data of the object 2 to be produced. The apparatuses 1 may be configured for example as Laser-CUSING® apparatuses, i.e. as apparatuses for carrying out selective laser melting methods (SLM methods).

The apparatuses 1 comprise the functional component parts required in order to carry out additive construction processes; for example, a layering device 5 and an exposure device 6 are respectively shown in FIGS. 1, 2.

The layering device 5 is configured in order to form construction material layers to be selectively exposed, or to be selectively solidified, in a construction plane E of the apparatuses 1, and to this end comprises a layering element (not referred to in further detail), particularly in the manner or form of a blade, mounted movably—as indicated by the respective double arrows P1—relative to the construction plane E of the apparatuses 1.

The exposure device 6 is configured in order to selectively expose construction material layers to be selectively solidified in the construction plane E of the apparatuses 1, and to this end comprises at least one energy beam generating device 7, a light-guide fibre 8 optically coupled to the at least one energy beam generating device 7, a focusing device 9 (optional) optically coupled to the light-guide fibre 8, and a beam steering device 10 (scanner device) optically coupled to the focusing device 9. A respective energy beam generating device 7 is configured in order to generate an energy beam 4, the light-guide fibre 8 is configured in order to guide an energy beam 4, introduced into it from an energy beam generating device 7, between an input region 8a of the light-guide fibre 8 and an output region 8b of the light-guide fibre 8, the focusing device 9 is configured in order to focus the energy beams 4 introduced into it, and the beam steering device 10 is configured in order to direct the energy beams 4 introduced into it onto the regions, which are to be exposed, of a construction material layer to be selectively exposed, or to be selectively solidified. Even though they are schematically connected by lines in FIGS. 1, 2, the aforementioned constituent parts of the exposure device 6 are typically coupled directly to one another.

FIGS. 1, 2 furthermore represent a dosing module 11, a construction module 12 and an overflow module 13, which are docked to a lower region of an inertisable process chamber 14 of the apparatus 1. The aforementioned modules 11, 12, 13 may also form a lower region of the process chamber 14 of the apparatus 1.

The optical coupling of the respective energy beam generating devices 7—a plurality of energy beam generating devices 7 can be seen in FIG. 1, and a (single) energy beam generating device 7 is shown in FIG. 2—to the light-guide fibre 8 makes it possible for the energy beams 4 generated by the respective energy beam generating devices 7 to be introduced into the light-guide fibre 8.

The light-guide fibre 8 comprises a plurality of fibre cores, i.e. in FIGS. 1, 2 by way of example 3 fibre cores 15.1-15.3 and in the other Figs by way of example 7 fibre cores 15.1-15.7, at least one energy beam 4 being introducible or introduced into each fibre core 15. The light-guide fibre 8 may to this extent be referred to as a multicore fibre. Each fibre core 15 is formed from a light-guiding material, i.e. for example a glass fibre material, and therefore has light-guiding properties; each fibre core 15 is therefore to be considered as a separate light-guide element (inside) of the light-guide fibre 8. Each fibre core 15 comprises a fibre core input region (not denoted), via which an energy beam 4 is introducible or introduced into the respective fibre core 15, and a fibre core output region, via which an energy beam 4 introduced into the respective fibre core 15 can be or is output from the respective fibre core 15. A respective fibre core input region forms the or a part of the input region 8a of the light-guide fibre 8, and a respective fibre core output region forms the or a part of the output region 8b of the light-guide fibre 8.

The light-guide fibre 8 has a cable-like or cable-shaped, i.e. generally an elongate, geometrical configuration. The respective fibre cores 15 have a fibre-like or fibre-shaped, i.e. generally an elongate, geometrical configuration. The respective cross-sectional geometry of the fibre cores 15 is much smaller than the cross-sectional geometry of the light-guide fibre 8, so that the fibre cores 15 may readily be arranged or formed inside the light-guide fibre 8.

By formation of the light-guide fibre 8 with a plurality of separate fibre cores 15, it is possible to introduce a plurality of energy beams 4 into the light-guide fibre 8, or to output a plurality of energy beams 4 from the light-guide fibre 8 and therefore from the exposure device 6. In this way, a variatable or variable profile of the energy radiation which can be or is output overall from the exposure device 6 can be produced with one and the same light-guide fibre 8.

In relation to the coupling of the one light-guide fibre 8 to corresponding energy beam generating devices 7, there are in principle two possible variants: the light-guide fibre 8 may be couplable or coupled directly, as shown in FIG. 1, or indirectly, as shown in FIG. 2, to an energy beam generating device 7.

The variant according to which the light-guide fibre 8 is optically coupled directly to the energy beam generating devices 7 includes, as shown in FIG. 1, the possibility that the light-guide fibre 8 is optically coupled to a plurality of energy beam generating devices 7. It can in this case be seen that each fibre core 15 of the light-guide fibre 8 is optically coupled to a particular energy beam generating device 7. An energy beam 4 emerging from the energy beam generating device 7 optically coupled to each fibre core 15 is therefore introduced into this fibre core.

Respective energy beams 4 generated by respective energy beam generating devices 7 may differ in terms of at least one energy beam parameter, i.e. for example intensity. It is thus possible to introduce a plurality of energy beams 4 optionally differing in relation to at least one energy beam parameter into the light-guide fibre 8, or to output a plurality of energy beams 4 optionally differing in relation to at least one energy beam parameter from the light-guide fibre 8. The energy beam generating devices 7 optically coupled to the light-guide fibre 8 may therefore be configured distinctly or individually, particularly in relation to the beam properties of the respective energy beams 4 generated by them, in such a way that an energy beam 4 having particular energy beam properties can be introduced into the light-guide fibre 8 by means of each energy beam generating device 7.

The variant according to which the light-guide fibre 8 is optically coupled indirectly to the energy beam generating device 7 includes the possibility, shown in FIG. 2, that the light-guide fibre 8 is optically coupled to the energy beam generating device 7 with the interposition of an energy beam splitting device 16. The energy beam splitting device 16 is configured in order to split an energy beam 4 introduced into it into a plurality of energy beams 4, and to this end comprises an, in particular optical, energy beam splitting element (not shown), which may for example be an optical beam splitter (cube). Each fibre core 15 of the light-guide fibre 8 is in this case optically coupled to an output region (not denoted) of the energy beam splitting device 16, from which an energy beam 4 can be or is output. An energy beam 4 output from the output region, coupled to each fibre core 15, of the energy beam splitting device 16 is therefore introduced into this fibre core.

The energy beam splitting device 16 may be configured in order to split an energy beam 4 into a plurality of energy beams 4 differing in relation to at least one energy beam parameter, as mentioned, for example intensity. In this way, even with a single energy beam generating device 7, it is possible, as shown in FIG. 2, to introduce a plurality of energy beams 4 differing in relation to at least one energy beam parameter into the light-guide fibre 8, or to output a plurality of energy beams 4 differing in relation to at least one energy beam parameter from the light-guide fibre 8 or the exposure device 6. The energy beam splitting device 16 may, for example by suitable coating of an energy beam splitting surface, be configured in such a way that in principle different energy beams 4 can be introduced into the light-guide fibre 8 by means of it.

Different energy beams 4, i.e. energy beams 4 with different energy beam properties, may therefore be introducible into at least two fibre cores 15 of the light-guide fibre 8. For example, an energy beam 4 with first energy beam properties, in particular a first intensity, may be introduced into a first fibre core 15, and an energy beam 4 with energy beam properties different from the first energy beam properties, in particular an intensity different from the first intensity, may be introduced into at least one further fibre core 15.

FIGS. 3-8 respectively show a diagrammatic representation of a light-guide fibre 8 according to one exemplary embodiment in a cross-sectional view. As mentioned, the light-guide fibre 8 shown in FIGS. 3-8 comprises for example seven fibre cores 15 (15.1-15.7). It should be noted that respective fibre cores 15 shown in FIGS. 3-8 as being filled in are represented in a state in which an energy beam 4 is output from them, and respective fibre cores 15 shown as not being filled in are represented in a state in which an energy beam 4 is not output from them. It should furthermore be noted that the steering or scan direction of the energy radiation output overall from the exposure device 6 is respectively represented by the arrows P2.

With the aid of FIGS. 3-8, it can be seen that the fibre cores 15 of the light-guide fibre 8 may have the same (cross-sectional) fibre core geometries; the energy beams 4 output via the respective fibre cores 15 therefore have the same energy beam geometries, in particular energy beam diameters (spots), or energy beam cross sections. In principle, however, it is also possible for the fibre cores 15 of the light-guide fibre 8 to have different (cross-sectional) fibre core geometries; the energy beams 4 output via the respective fibre cores 15 therefore have different energy beam geometries, in particular energy beam diameters (spots), or energy beam cross sections.

With the aid of FIGS. 3-8, it can furthermore be seen that the fibre cores 15 may be arranged distributed symmetrically over the cross-sectional area, which is for example in this case round, of the light-guide fibre 8. FIGS. 3-8 respectively show an exemplary embodiment of a light-guide fibre 8 having a round cross-sectional area with arrangement of a first fibre core 15.1 at the centre (with respect to a symmetry axis or central axis) of the light-guide fibre 8 and arrangement of further fibre cores 15.2-15.7 outside the centre of the light-guide fibre 8. The fibre cores 15.1 and 15.2-15.7 are therefore arranged at different radial positions with respect to the symmetry axis or central axis of the light-guide fibre 8. A first fibre core 15.1 is arranged centrally, i.e. at or in the region of the symmetry axis or central axis of the light-guide fibre 8, and the other fibre cores 15.2-15.7 are arranged symmetrically distributed around the fibre core 15.1.

It can furthermore be seen with the aid of FIGS. 3-8 that the fibre cores 15.1-15.7 may be arranged distributed equidistantly relative to one another. The distance from each fibre core 15.1-15.7 to each fibre core 15.1-15.7 arranged immediately next to it is the same in FIGS. 3-8. Specifically, the fibre cores 15.1-15.7 may be arranged for example at a distance of about 200 μm relative to one another.

As mentioned, energy beams 4 may be introduced individually, or energy beams 4 with different energy beam properties, i.e. for example different intensity, may be introduced individually into the fibre cores 15.1-15.7 of the light-guide fibre 8. The exposure device 6, or the apparatus 1, to this end comprises a control device 17, which is implemented as hardware and/or software and is configured in order to control the energy beams 4, or the energy beam properties of the energy beams 4 introducible or introduced into the fibre cores 15.1-15.7 of the light-guide fibre 8. The control device 17 shown in FIGS. 1, 2 interacts in terms of control technology in particular with the energy beam generating devices 7 of the exposure device 6, in order to control the energy beams 4 or the energy beam properties of the energy beams 4 which can be or are output therefrom.

The control device 17 may be configured in order to form a defined profile, in particular intensity profile, of the energy radiation 4 which can be or is output overall from the exposure device 6, by defined control, in particular as a function of position and/or time, of the energy beams 4 or of the energy beam properties, in particular the intensity, of the energy beams 4 introduced into the fibre cores 15.1-15.7. In this way, i.e. in particular by individual control of the intensities of the energy beams 4 introduced into the fibre cores 15.1-15.7, various profiles may be generated (beam shaping) and output from the light-guide fibre 8, so that merely by way of example reference is made to Gaussian, inverse Gaussian and top-hat profiles.

The control device 17 may furthermore be configured in order to form a particular exposure pattern of the energy radiation which can be or is output overall from the exposure device 6, by defined control, in particular as a function of position and/or time, of the energy beams 4 or of the energy beam properties of the energy beams 4 introduced into the fibre cores 15.1-15.7 of the light-guide fibre 8. In this way, various exposure patterns can be generated. Corresponding exposure patterns may be based on the implementation of particular exposure strategies, i.e. for example the so-called chase strategy, according to which a second energy beam 4 is tracked after a first energy beam 4, or the wobble strategy, according to which energy beams 4 are moved around a particular region to be exposed of a construction material layer. By means of corresponding exposure strategies, it is for example possible to carry out thermal pretreatments of construction material layers to be selectively solidified, or thermal after-treatments of selectively solidified construction material layers.

Figure 4:
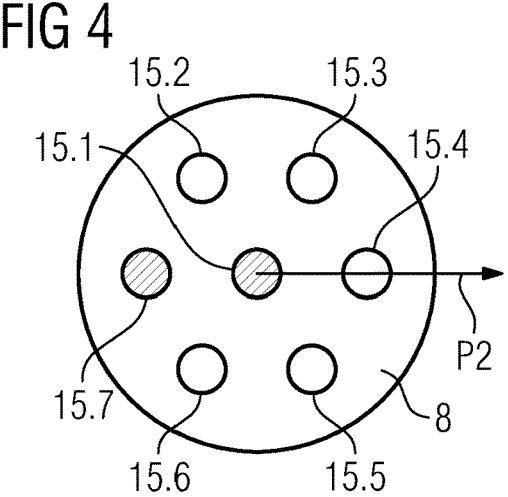

FIG. 4 indicates by way of example the implementation of a chase strategy, since the energy beam 4 output from the fibre core 15.7 tracks the energy beam 4 output from the fibre core 15.1. By means of the chase strategy, a thermal after-treatment of a selectively solidified construction material layer can be carried out.

Figure 6:
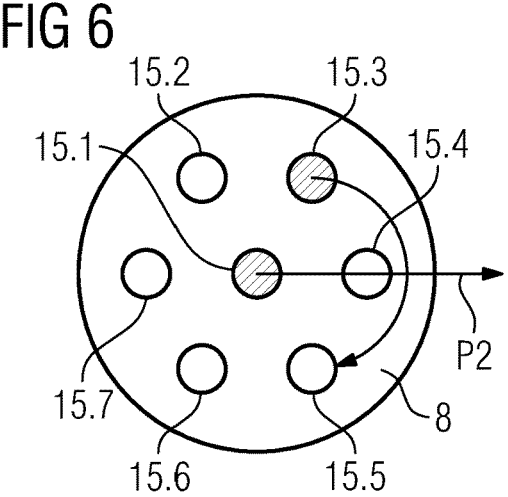

FIG. 6 indicates the implementation of a wobble strategy, since the energy beams 4 output from the fibre cores 15.1, 15.3 and 15.5 are moved, for example by alternate operation of the energy beam generating devices 7 coupled to the fibre cores 15.1, 15.3 and 15.5, around a particular region to be exposed.

By means of corresponding exposure patterns or exposure strategies, it is in general also possible to carry out single or multiple exposures of particular regions to be exposed.

Figure 5:
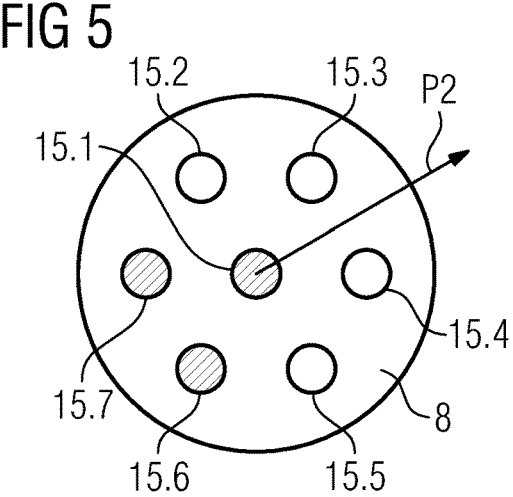
Figure 7:
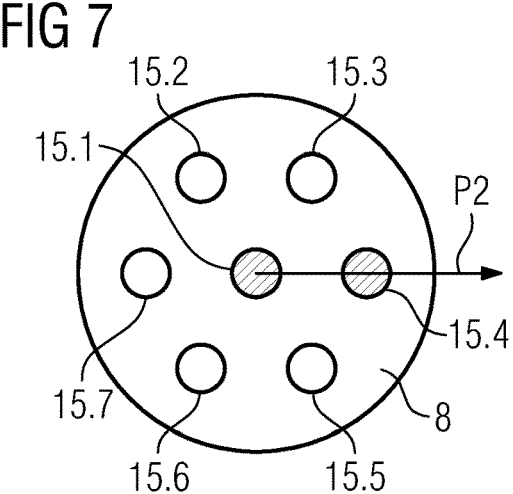
Figure 8:
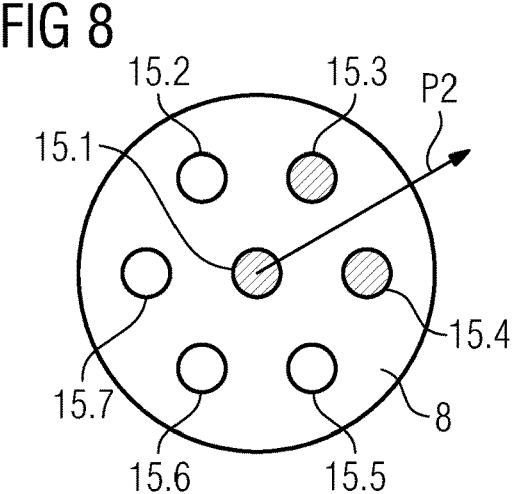

With the aid of FIGS. 5, 7, 8, it can be seen that the control device 17 may be configured, by defined control of the energy beams 4 or of the energy beam properties of the energy beams 4 introduced into the fibre cores 15.1-15.7 of the light-guide fibre 8, in order to carry out selective exposure and consequent selective solidification of a construction material layer by means of at least one first energy beam 4 output from at least one first fibre core 15.1, and in order to carry out thermal pretreatment, at least in sections, of a construction material layer to be selectively solidified and/or thermal after-treatment, at least in sections, of a selectively solidified construction material layer by means of a further energy beam 4 which is output from at least one further fibre core 15.3, 15.4, 15.6, 15.7. The energy beam 4 for selective exposure and consequent selective solidification of a construction material layer is output in FIGS. 5, 7, 8 from the fibre core 15.1 arranged in the middle or centrally with respect to the cross-sectional geometry of the light-guide fibre 8, and the energy beams 4 for thermal pretreatment of a construction material layer to be selectively solidified or for thermal after-treatment of a selectively solidified construction material layer are output in FIGS. 5, 7, 8 from the fibre cores 15.3, 15.4, 15.6, 15.7 arranged away from the middle or off-centre with respect to the cross-sectional geometry of the light-guide fibre 8; specifically, FIG. 5 shows thermal after-treatment which is obtained from the arrangement of the fibre cores 15.1, 15.6, 15.7 relative to the scan direction, cf. arrow P2, and FIGS. 7, 8 respectively show thermal pretreatment which is obtained from the arrangement of the fibre cores 15.1, 15.3, 15.4 relative to the scan direction, cf. arrow P2.

The invention claimed is:

1. An exposure device for use with an apparatus for additively manufacturing three-dimensional objects, the exposure device comprising:
a plurality of energy beam generating devices respectively configured to generate an energy beam;
a light-guide fiber comprising a plurality of fiber cores respectively configured to guide at least one energy beam from an input region of the light-guide fiber to an output region of the light-guide fiber, respective ones of the plurality of fiber cores being optically couplable or coupled to a corresponding one of the plurality of energy beam generating devices, at least one energy beam being introducible or introduced into respective ones of the plurality of fiber cores; and
a control device, the control device configured to:
form a selected energy beam-exposure pattern comprising the plurality of energy beams, by an alternating operation of the plurality of energy beam generating devices and a defined control of the energy beam properties of the energy beams introducible or introduced into the plurality of fiber cores, the alternating operation of the plurality of energy beam generating devices and the defined control of the energy beam properties comprising a function of time and/or position of the energy beams; and
carry out, by the alternating operation of the plurality of energy beam generating devices and the defined control of the energy beam properties of the energy beams introducible or introduced into the plurality of fiber cores, selective exposure and consequent selective solidification of a construction material layer with a first energy beam output from at least one centrally arranged fiber core of the plurality of fiber cores, and thermal pretreatment, at least in sections, of a construction material layer to be selectively solidified and/or thermal after-treatment, at least in sections, of a selectively solidified construction material layer with one or more further energy beams output from at least one off-center fiber core of the plurality of fiber cores.

2. The exposure device of claim 1, comprising:
at least one energy beam splitting device configured to split an energy beam into a plurality of energy beams differing in relation to at least one energy beam parameter, wherein at least some of the plurality of fiber cores are optically couplable or coupled to at least one of the plurality of energy beam generating devices indirectly with the interposition of the least one energy beam splitting device.

3. The exposure device of claim 1, wherein respective ones of the plurality of fiber cores have the same cross-sectional fiber core geometries relative to one another.

4. The exposure device of claim 1, wherein respective ones of the plurality of fiber cores are configured or arranged symmetrically over the cross-sectional area of the light-guide fiber.

5. The exposure device of claim 1, wherein starting with a light-guide fiber having a round or roundish cross-sectional area, at least some of the plurality of fiber cores are configured or arranged at different radial positions with respect to a central axis of the light-guide fiber.

6. The exposure device of claim 1, wherein at least some of the plurality of the fiber cores are configured or arranged equidistantly relative to one another.

7. The exposure device of claim 1, wherein respective ones of the plurality of energy beam generating devices are configured to generate respectively different energy beams with different energy beam properties relative to one another.

8. The exposure device of claim 1, wherein an energy beam from a corresponding one of the plurality of energy beam generating devices is introducible or introduced into at least two of the plurality of fiber cores.

9. The exposure device of claim 1, wherein the control device is configured to form a defined profile of the energy radiation which can be or is output overall from the exposure device, by defined control of the energy beam properties of the plurality of energy beams introducible or introduced into respective ones of the plurality of fiber cores.

10. The exposure device of claim 1, wherein respective ones of the plurality of fiber cores have different cross-sectional fiber core geometries relative to one another.

11. The exposure device of claim 1, wherein respective ones of the plurality of fiber cores are configured or arranged asymmetrically over the cross-sectional area of the light-guide fiber.

12. An apparatus for additively manufacturing three-dimensional objects, the apparatus comprising:
   a process chamber;
   a construction module;
   an exposure device; and
   a control device;
   wherein the exposure device comprises:
      a plurality of energy beam generating devices respectively configured to generate an energy beam; and
      a light-guide fiber comprising a plurality of fiber cores respectively configured to guide at least one energy beam from an input region of the light-guide fiber to an output region of the light-guide fiber, respective ones of the plurality of fiber cores being optically couplable or coupled to a corresponding one of the plurality of energy beam generating devices, at least one energy beam being introducible or introduced into respective ones of the plurality of fiber cores;
   wherein the control device is configured to form a selected energy beam-exposure pattern comprising the plurality of energy beams, by an alternating operation of the plurality of energy beam generating devices and a defined control of the energy beam properties of the energy beams introducible or introduced into the plurality of fiber cores, the alternating operation of the plurality of energy beam generating devices and the defined control of the energy beam properties comprising a function of time and/or position of the energy beams;
   wherein respective ones of the plurality of energy beam generating devices are configured to generate respectively different energy beams with different energy beam properties relative to one another; and
   wherein the control device is further configured, by the alternating operation of the plurality of energy beam generating devices and the defined control of the energy beam properties of the energy beams introducible or introduced into the plurality of fiber cores, to carry out selective exposure and consequent selective solidification of a construction material layer with a first energy beam output from at least one centrally arranged fiber core of the plurality of fiber cores, and to carry out thermal pretreatment, at least in sections, of a construction material layer to be selectively solidified and/or thermal after-treatment, at least in sections, of a selectively solidified construction material layer with one or more further energy beams output from at least one off-center fiber core from among the plurality of fiber cores.

13. The apparatus of claim 12, wherein the exposure device comprises:
   at least one energy beam splitting device configured to split an energy beam into a plurality of energy beams differing in relation to at least one energy beam parameter, wherein the at least some of the plurality of fiber cores are optically couplable or coupled to at least one of the plurality of energy beam generating devices indirectly with the interposition of the least one energy beam splitting device.

14. The apparatus of claim 12, wherein the plurality of fiber cores have the same or different cross-sectional fiber core geometries relative to one another.

15. The apparatus of claim 12, wherein the plurality of fiber cores are configured or arranged symmetrically or asymmetrically over the cross-sectional area of the light-guide fiber.

16. The apparatus of claim 12, wherein starting with a light-guide fiber having a round or roundish cross-sectional area, at least some of the plurality of fiber cores are configured or arranged at different radial positions with respect to a central axis of the light-guide fiber.

17. The apparatus of claim 12, wherein at least some of the plurality of the fiber cores are configured or arranged equidistantly relative to one another.

18. The apparatus of claim 12, wherein an energy beam from a corresponding one of the plurality of energy beam generating devices is introducible or introduced into at least two of the plurality of fiber cores.

19. The apparatus of claim 12, wherein the control device is configured to form a defined profile of the energy radiation which can be or is output overall from the exposure device, by defined control of the energy beam properties of the plurality of energy beams introducible or introduced into respective ones of the plurality of fiber cores.

* * * * *